(12) United States Patent  
Ptitsyn et al.

(10) Patent No.: US 8,059,336 B2
(45) Date of Patent: Nov. 15, 2011

(54) RAPID MICROSCOPE SCANNER FOR VOLUME IMAGE ACQUISITION

(75) Inventors: Nikolai Ptitsyn, Moscow (RU); Ole Eichhorn, Westlake Village, CA (US)

(73) Assignee: Aperio Technologies, Inc., Vista, CA (US)

( * ) Notice: Subject to any disclaimer, the term of this patent is extended or adjusted under 35 U.S.C. 154(b) by 243 days.

(21) Appl. No.: 12/114,611

(22) Filed: May 2, 2008

(65) Prior Publication Data

US 2009/0231689 A1   Sep. 17, 2009

Related U.S. Application Data

(60) Provisional application No. 60/916,240, filed on May 4, 2007.

(51) Int. Cl.
*G02B 21/00*   (2006.01)

(52) U.S. Cl. ......... 359/368; 359/363; 359/383; 359/385

(58) Field of Classification Search .......... 359/368–390
See application file for complete search history.

(56) References Cited

U.S. PATENT DOCUMENTS

| | | | |
|---|---|---|---|
| 5,774,224 A * | 6/1998 | Kerstens | 356/394 |
| 6,396,296 B1 * | 5/2002 | Tarter et al. | 324/765 |
| 6,677,656 B2 | 1/2004 | Francois | |
| 6,711,283 B1 | 3/2004 | Soenksen | |
| 6,816,606 B2 | 11/2004 | Wetzel et al. | |
| 6,876,776 B2 | 4/2005 | Recht | |
| 6,917,696 B2 * | 7/2005 | Soenksen | 382/128 |
| 7,075,633 B2 | 7/2006 | Webmann | |
| 7,155,049 B2 | 12/2006 | Wetzel et al. | |
| 2004/0129858 A1 | 7/2004 | Czarnetzki | |
| 2004/0174541 A1 * | 9/2004 | Freifeld | 356/614 |
| 2004/0264765 A1 | 12/2004 | Ohba | |
| 2005/0089208 A1 | 4/2005 | Dong et al. | |

FOREIGN PATENT DOCUMENTS

WO   WO2007095090   8/2007

OTHER PUBLICATIONS

International Preliminary Report on Patentability from PCT/US2008/62504 Nov. 19, 2009.
International Search Report and Written Opinion from PCT/US2008/062504 dated Sep. 24, 2008.

* cited by examiner

*Primary Examiner* — Thong Nguyen
(74) *Attorney, Agent, or Firm* — Pattric J. Rawlins; Procopio Cory Hargreaves & Savitch LLP

(57) ABSTRACT

Apparatus for and method of rapid three dimensional scanning and digitizing of an entire microscope sample, or a substantially large portion of a microscope sample, using a tilted sensor synchronized with a positioning stage. The system also provides a method for interpolating tilted image layers into a orthogonal tree dimensional array or into its two dimensional projection as well as a method for composing the volume strips obtained from successive scans of the sample into a single continuous digital image or volume.

8 Claims, 6 Drawing Sheets

RAPID MICROSCOPE SCANNER FOR VOLUME IMAGE ACQUISITION

RELATED APPLICATION

The present application claims priority to U.S. provisional patent application Ser. No. 60/916,240 filed May 4, 2007, which is incorporated herein by reference in its entirety.

BACKGROUND

1. Field of the Invention

The invention relates generally to the field of optical microscopy, and in particular to an automatic microscope scanner enabling rapid three dimensional image acquisition.

2. Related Art

Automated microscope scanners such as disclosed in U.S. Pat. No. 6,711,283, which is incorporated herein in its entirety, enable rapid digitizing of an entire glass slide with a biological sample. These microscope scanners are particularly efficient when the sample thickness, i.e. the depth of the specimen on the glass is smaller or close to the depth of field of the microscope lens. The depth of field is the distance in front of and behind the theoretical focal plane where the specimen appears to be in focus.

A problem commonly arises when the specimen has a thick volumetric structure. On one hand, smaller depth of field provides better spatial resolution along the third dimension of the volumetric specimen and reduces image fusion from adjacent depth layers. On the other hand, it becomes increasingly difficult to ensure focus in microscope scanners with small depth of field as the thick specimen may have a significant depth variance within the field of view. The microscopist may need to observe the same region of the specimen at multiple focal planes. Consequently, such volumetric specimens cannot be digitized efficiently with two-dimensional scanners.

Conventional scanners are designed to ensure a tradeoff between the focus quality and the magnification at which the sample can be viewed. While higher magnification microscope objective lenses normally have higher numerical apertures (NA) and provide the microscopist with higher resolution images, the depth of field decreases. For example, at low magnification such as 10 times (10×) and small NA such as 0.25, a microscope system may have the depth of field of 8.5 um. At higher magnification such as 40× and larger NA such as 0.65, the depth of field is reduced to 1.0 um. At high numerical aperture lenses, depth of field is determined primarily by wave optics, while at lower numerical apertures, the geometrical optical circle of confusion dominates the phenomenon.

One can approach a solution to the depth of field problem by improving the focus accuracy of the microscope scanner. Existing automatic focus methods include such techniques as pre-focusing in points obtained from the macro focus image and generating a three-dimensional data set corresponding to an optimal specimen distance as disclosed in U.S. Pat. No. 6,816,606. Provided the scanner follows precisely this three dimensional profile, it captures an image with increased contrast. Other autofocus methods include tilt designs of either the glass sample or the sensor detecting the focus position. For example, some methods for high speed autofocus by means of tilted designs are described in U.S. Pat. No. 6,677,656 and US Patent Publication Nos. 2005/0089208, 2004/0129858.

The focus accuracy is important at high magnifications to the extent of the specimen thickness. After an accuracy level is achieved matching the thickness of the specimen, no further advance can be made to improve the focus quality of the digital image. In particular, a thick specimen with a three dimensional structure or volume texture cannot be fully represented by its two dimensional image. A linear array sensor typically used in scanning microscopes cannot capture optical images from different focal planes within its field of view at the same time. If the depth of specimen structure varies to a large extent, no uniform focus can be attained within the field of view.

The above focus problem can be addressed by capturing a series of digital images from different focal planes. This series is known as an image stack or an image volume and provides an extended depth of field and preserves the three dimensional structure of the specimen. Image volumes can be further transformed into a three dimensional model or fused into a two dimensional image with enhanced focus. A number of microscope designs are available to acquire image stacks, for example, described in US Patent Publication No. 2004/0264765.

A conventional approach to image stack acquisition is repeated scans with a linear or area scan camera. A drawback of this approach is a substantial increase of the scanning time and memory usage to store digital images. For example, in order to capture a stack of 20 images, a conventional scanner will need to perform 20 runs followed by alignment and stitching procedures. An area scan microscope working in an image stack tiling mode is likely to be inadequately slow and may introduce stitching artifacts to the output volume image. This performance drawback may be critical for express diagnostic applications in a clinical environment and real-time surface inspection applications in an industrial environment.

Therefore, what is needed is a system and method that overcomes these significant problems found in the conventional systems as described above.

SUMMARY

Systems and methods are provided for rapid three dimensional scanning and digitizing of an entire microscope sample, or a substantially large portion of a microscope sample, using a tilted sensor synchronized with a positioning stage. The systems and methods also provide for interpolating tilted image layers into an orthogonal three dimensional array or into its two dimensional projection as well as a method for composing the volume strips obtained from successive scans of the sample into a single continuous digital image or volume. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for rapid three dimensional scanning and digitizing of an entire microscope sample, or a substantially large portion of a microscope sample, using a tilted sensor synchronized with a positioning stage. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
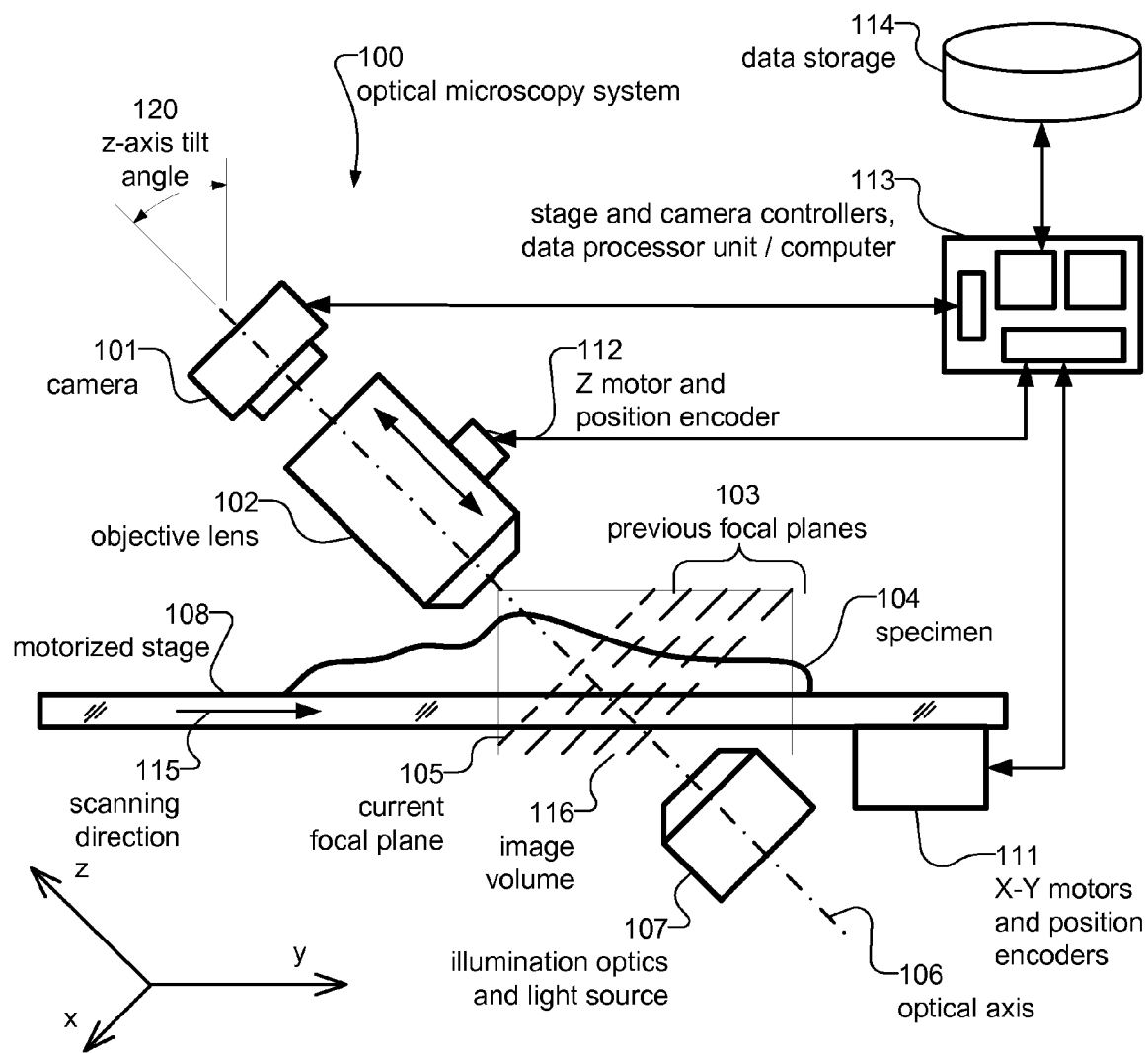
FIG. 1 is a block diagram of an optical microscopy system operating in transmission mode according to an embodiment of the present invention.

Turning first to FIG. 1, a block diagram of an embodiment of an optical microscopy system 100 according to the present invention is shown. The system serves to scan and digitize a specimen or sample 104. The sample 104 can be anything that may be interrogated by optical microscopy. For instance, the sample 104 may be a microscope slide. A microscope slide is frequently used as a viewing substrate for specimens that include tissues and cells, chromosomes, DNA, protein, blood, bone marrow, urine, bacteria, beads, cytology smear, liquid base cytology preparation, biopsy materials, or any other type of biological material or substance that is either dead or alive, stained or unstained, labeled or unlabeled.

The sample 104 may also be an array of any type of DNA or DNA-related material such as cDNA or RNA or protein that is deposited on any type of slide or other substrate, including any and all samples commonly known as microarrays. The sample 104 may be a microtiter plate, for example a 96-well plate. Other examples of the sample 104 include integrated circuit boards, electrophoresis records, petri dishes, film, semiconductor materials, forensic materials, or machined parts.

The system 100 includes a camera 101, a microscope objective lens 102, a motorized stage 108, illumination optics and light source 107, data processor 113 and data storage 114. The sample 104 is positioned on the motorized stage 108 for volumetric scanning. The stage 108 is driven by one or more motors 111 connected to a data processor 113. The data processor 113 determines the position of the sample 104 on the motorized stage 108 via the position encoder 111. The motorized stage 108 moves the sample 104 in at least the two axes (x/y) that are in the plane of the sample 104. In the illustrated embodiment, the camera 101, the objective lens 102 and illumination optics 107 are positioned on the optical z-axis 106 tilted relatively to the plane of the motorized stage.

The tilt angle 120 between the optical axis 106 and the normal to the plane of the motorized stage 108 is selected from the range between 0° and a limit angle. The limit angle depends on the barrel dimensions at the end of the lens 102 and on the working distance between the lens 102 and the focal plane 105 as shown in Table 1.

TABLE 1

| Working distance of lenses, mm | Maximum lenses barrel diameter at the end of lenses, mm | | | |
|---|---|---|---|---|
| | limit angle 45° | limit angle 30° | limit angle 20° | limit angle 15° |
| 0.5 | 1 | 1.7 | 2.7 | 3.7 |
| 0.75 | 1.5 | 2.5 | 4.1 | 5.5 |
| 1 | 2 | 3.4 | 5.4 | 7.4 |
| 1.5 | 3 | 5.1 | 8.2 | 11.1 |
| 2 | 4 | 6.9 | 10.9 | 14.9 |

For example, Olympus UPLFLN 20× lens with the working distance 2.1 mm allows using the limit angle of 22°.

The choice of the tilt angle 120 depends on desirable dimensions and resolution of the output image volume as well as physical distortion considerations. A small value of the tilt angle such as 1° will ensure an extension of the depth of field, good spatial resolution along the x and y axis, and low resolution along the z axis. Larger values of the tilt angle such as 15° will lead to a substantial increase of the depth of field and the z-resolution at the cost of the spatial resolution along the x and y axis being reduced.

Movements of the sample 104 along the optical z-axis may also be necessary for certain applications of the system 100, for example, for focus control. Z axis movement is accomplished with the motor 112 preferably piezo positioned. The z-motor 112 is attached to the microscope objective 102 and is connected to and directed by data processor 113.

Position commands from the data processor 113 are converted to electrical commands to drive motors 111 and 112. It should be obvious that the optimum selection of the stage 108, motors 111, 112 and the data processor 113 depends on many factors, including the nature of the sample 104, the desired time for sample digitization, and the desired resolution of the resulting digital image of the sample 104.

The microscope objective lens 102 can be any microscope objective lens commonly available. One of ordinary skill in the art will realize that the choice of which objective lens to use will depend on the particular circumstances. In one embodiment of the present invention, the scope objective lens 102 is of the infinity-corrected type.

In one embodiment, the sample 104 is illuminated by the illumination system 107 and imaged in transmission mode, with the camera 101 sensing optical energy that is transmitted by the sample 104, or conversely, optical energy that is absorbed by the sample 104.

The illumination system 107 includes a light source and light condensation optics. The light source in the presently preferred embodiment includes a variable intensity halogen light source. However, the light source could also be any other type of arc-lamp, laser, or other source of light. The condensation optics in one embodiment includes a standard Kohler illumination system with two conjugate planes that are orthogonal to the optical axis z.

The tilted design of the illumination system 107 changes the light reflection coefficient and displaces the beam relatively the original direction of the light. Tilt angles under 30° do not seriously impact the reflection coefficient and the quality of image. Tilt angles above 45° leads to sharp increase of the sample glass reflection coefficient, leading to significant losses of the light energy reaching the objective lens 102. After 56°40', total reflection from the glass occurs and no light passes through. Therefore, the value of the tilt angle 120 larger than 56°40' is not suitable for volumetric scanning in transmission mode.

Tilt angles under 30° do not cause a significant beam displacement relatively to the original direction of the light. Tilt angles above 30° require special adjustments in the configuration of the objective lens 102 to ensure that the maximum field of view.

Figure 8:
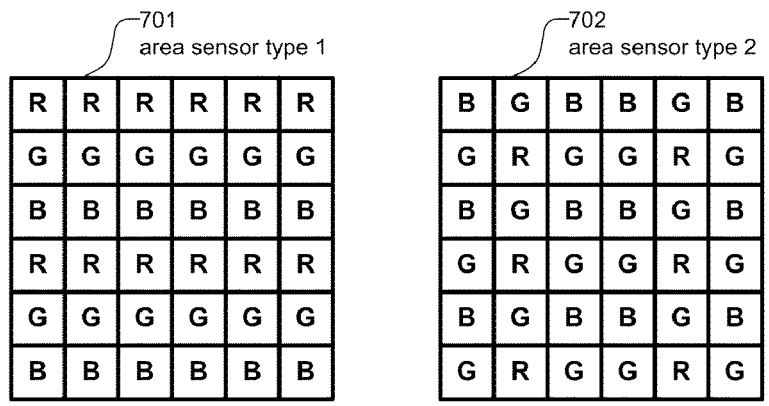
FIG. 8 is a diagram illustrating two color sensor designs according to embodiments of present invention.

The presently preferred embodiment of the system 100 is based on an area scan camera 101 with sensor elements (pixels) arranged in a two dimensional linear array. Any other type of cameras can be used such as line scan cameras or time delay integration (TDI) cameras (which are a form of line scan camera). The camera 101 may capture a grayscale or color image such as three channel red-green-blue (RGB) data. FIG. 8 shows two suitable configurations of color sensors.

A fundamental aspect of the system is synchronization between the shutter of the camera 101 and the encoders 111 of the motorized stage 108 via the data processor unit 113. As the sample 104 moves along the scanning direction 115, the camera captures a series of images from the focal plane 105 slicing the sample 104 at the tilt angle. The focal plane images 103 acquired during the scanning process are composed into the image volume 116. The image composition is carried out by the data processor unit 113. The output image volumes are saved in the image storage 114.

Synchronization can be also achieved by transmitting synchronization signals from the encoder 111 directly to the camera 101, i.e., by not involving the data processor unit 113. It also possible to use the internal camera timers to trigger the camera shutter, but this may produce a non-uniform scale of the output image volume along the scanning direction y.

Figure 2:
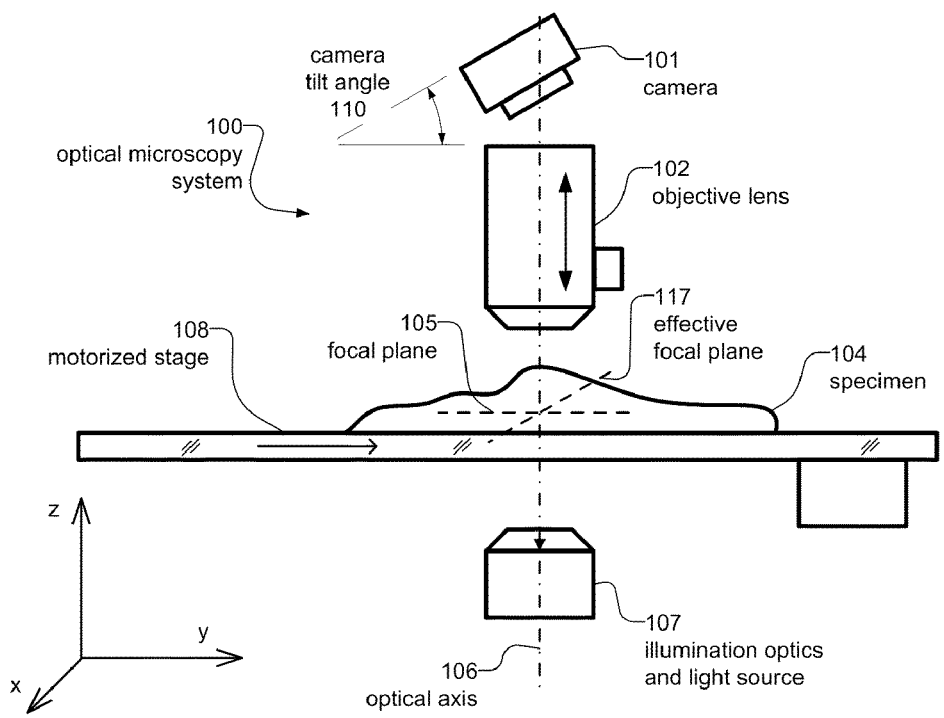
FIG. 2 is a block diagram of an optical microscopy system operating in transmission mode according to a second embodiment of the present invention.

According to the second embodiment of the present invention as illustrated in FIG. 2, the system 100 has the camera 101 tilted at certain angle 110 with respect to the main optical axis 106, which is orthogonal to the plane of the motorized stage 108. Though the lighting system 107 and the microscope objective lens 102 are configured to image the horizontal focal plane 105, the camera captures the light scattered at the effective tilted focal plane 117. Such design ensures high efficiency of the lighting system 107 and the microscope objective lens 102 as well as minimizes the internal reflections inside the sample 104 and its cover glass.

Figure 3:
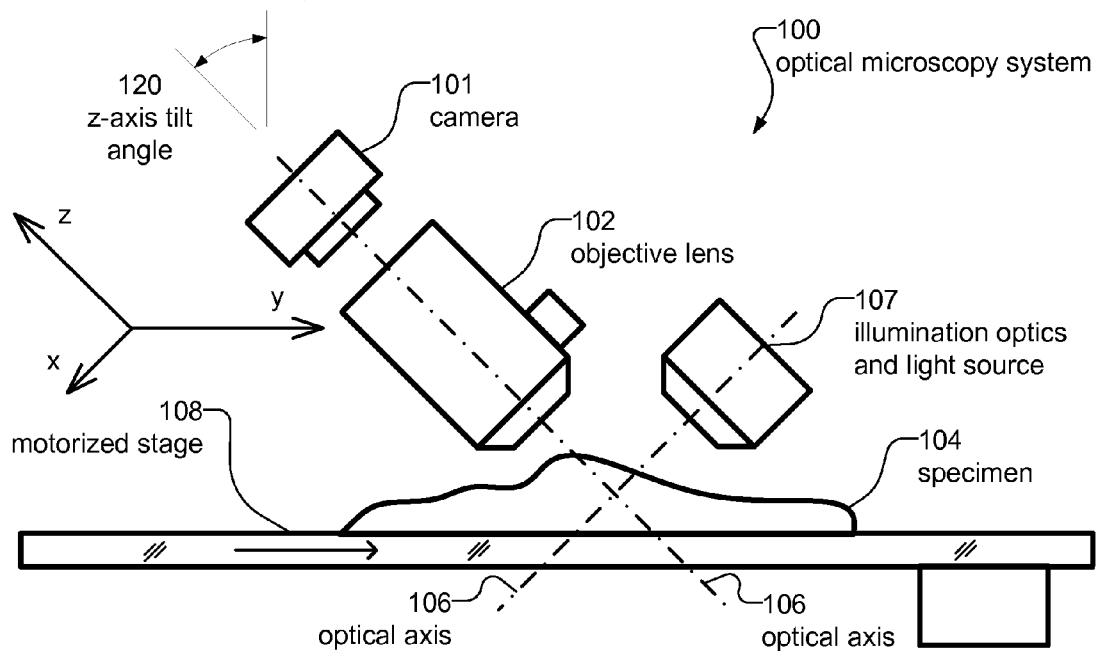
FIG. 3 is a block diagram of an optical microscopy system operating in reflection mode according to a third embodiment of the present invention.

Turning to the embodiment illustrated in FIG. 3, the system 100 is equally suitable for detecting optical energy that is reflected from the sample 104, in which case the lighting system 107 and the microscope objective lens 102 are positioned to ensure that the angle of light and the angle of incidence are equal. The lighting system 107 and the microscope objective lens 102 must be selected based on compatibility with reflection imaging.

Figure 4:
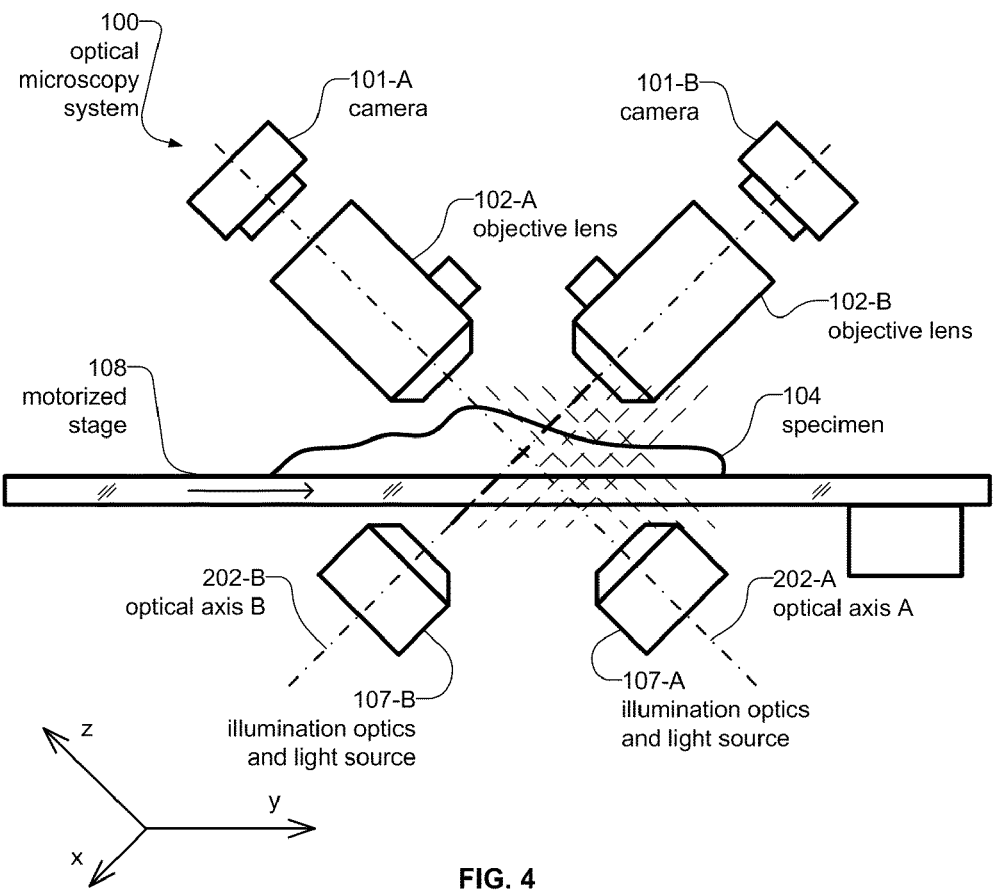
FIG. 4 is a block diagram of a dual lens microscopy system operating according to a fourth embodiment of the present invention.

FIG. 4 depicts a dual lens microscopy system operating according to a fourth embodiment. The two sets of cameras 101-A, 101-B, objective lenses 102-A, 102-B and illumination system 107-A, 107-B positioned along optical axes 202-A, 202-B enable stereoscopic vision, by which every point of the sample 104 can be imaged from two different viewpoints and at two different angles. A three dimensional reconstruction can be implemented in the data processor unit combining image data from the two cameras.

Overall, the system 100 is suitable, with appropriate well-known modifications, for the interrogation of microscopic samples in any known mode of optical microscopy.

Figure 5:
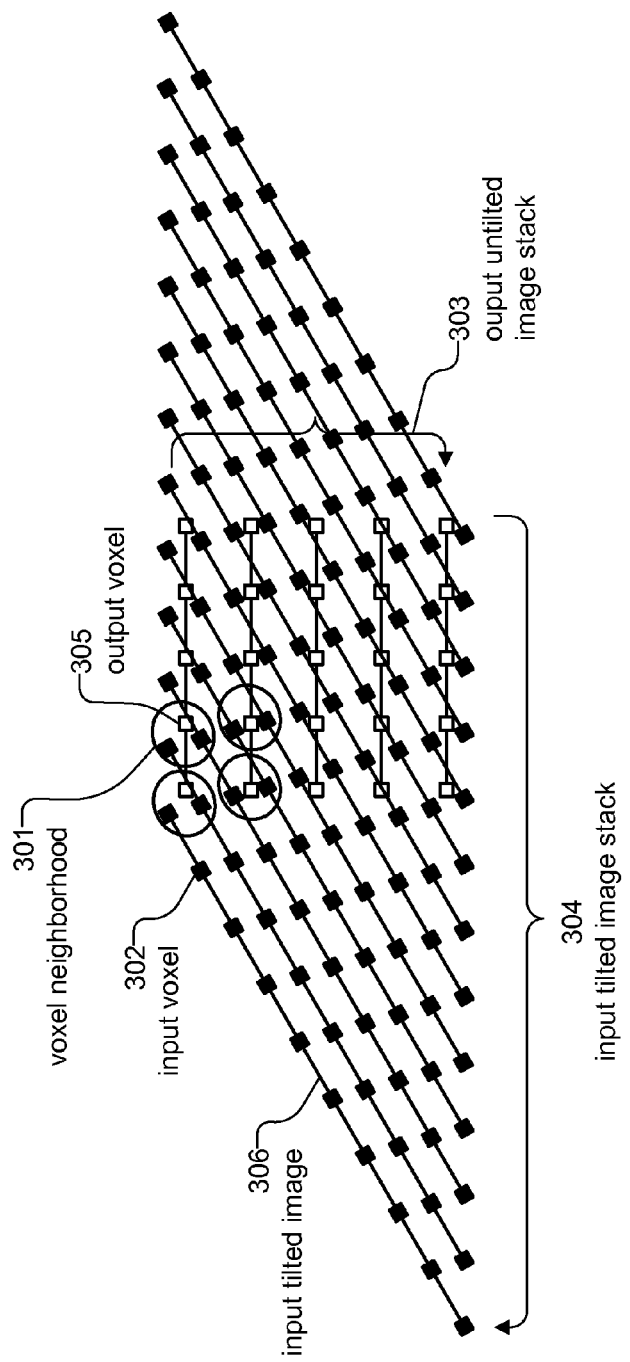
FIG. 5 is a diagram illustrating an example of tilted and horizontal image stack according to an embodiment of the present invention.

FIG. 5 illustrates alignment and interpolation processes from a tilted image stack 304 (input) into horizontal image stack 303 (output). This untilting process may be required to compress and to display the output image volume. The tilted image 306 captured by the camera 101 contains pixels or so called voxels 302 as the data is considered as a three dimensional volume. A precision alignment of the input images may be required to obtain a continuous volume stripe. Consecutive volume stripes are aligned to each other to produce a seamless volume of the entire slide. Alignment methods include correlation, least square error minimization, optical flow, gradient flow and other algorithms commonly used in digital imaging.

Figure 6:
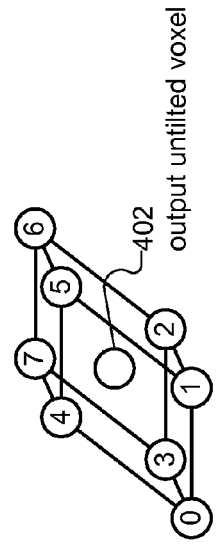
FIG. 6 is a diagram illustrating neighborhood voxels of a tilted image stack and one interpolation voxel according to an embodiment of the present invention.

For each output voxel 305, a neighborhood 301 of input voxels can be processed to estimate the value of the output voxel. A three dimensional drawing of the voxel neighborhood 301 is given in FIG. 6 with the input voxels such as 401 and output voxel 402. Applicable interpolation methods include nearest neighbor, bilinear, cubic and spline interpolation and other algorithms commonly used in digital imaging. It is advantageous to combine the volume interpolation with the Bayer mask color interpolation (if a two dimensional camera with Bayer mask is employed).

Figure 7:
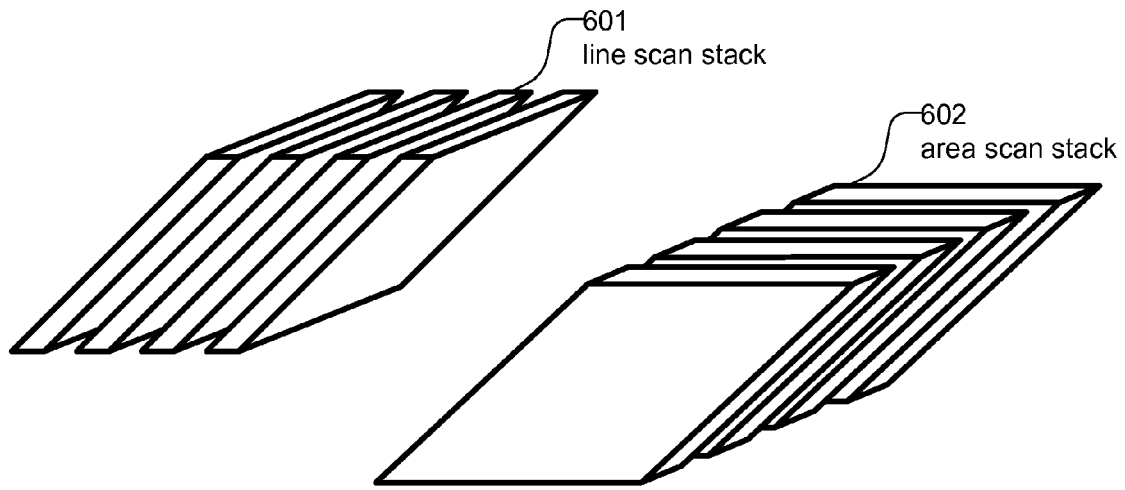
FIG. 7 is a diagram illustrating two scanning modes according to embodiments of present invention.

FIG. 7 shows two sample configurations of tilted image stacks. Stack 601 is produced by performing multiple tilted scans with a linear array camera. Stack 602 is produced by a single pass scan with an area camera. Configuration 602 is preferential as the scanning time will be dramatically reduced compared to configuration 601.

Figure 9:
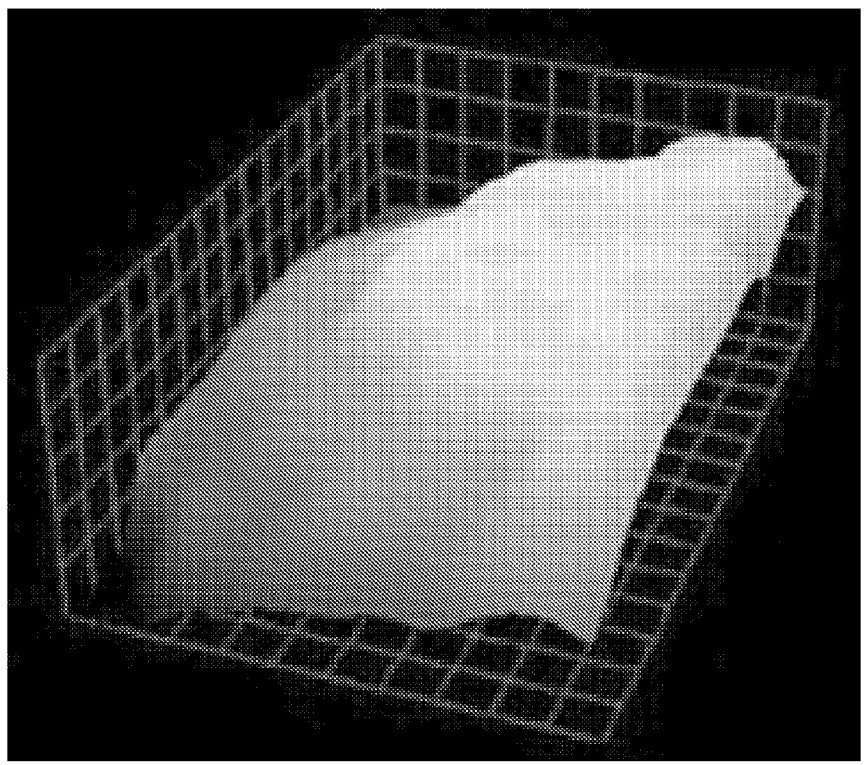
FIG. 9 is a diagram illustrating a virtual focal plane generated from an image volume according to an embodiment of the present invention.

Digital volume microscopy requires a substantial capacity of the disk storage. Suitable compression algorithms are provided in order to ensure efficiency of the storage and communication channel. The image volume can be transformed into a single layer image using a virtual focal plane algorithm. The virtual focal plane algorithm estimates a continuous three dimensional surface maximizing the local contrast and then fuses the image stacks onto the virtual focal plane. This results in a plurality of voxels being combined into a single enhanced pixel. For example, neighboring voxels can be interpolated into a single pixel. FIG. 9 represents a sample virtual focal plane. A number of fusion algorithms are available to combine image stack images including gradient domain fusion, graph-cut fusion, shortest-path fusion, maximal entropy fusion, maximum contrast fusion, minimal or maximal intensity fusion. The image fusion algorithm can be implemented as part of the camera firmware on its field-programmable data array (FPGA). This design may reduce the amount of image data that is transmitted from the camera to the data processor unit.

Unlike conventional focusing methods, the virtual focal plane approach enables fine variations of the focus depth within the field of view and therefore overcomes the problem of suboptimal focus of highly textural samples.

Image volume capturing enables real-time adjustment of the focus. Going back to FIG. 1, it is possible to perform image analysis of the volume data as the sample 104 is scanned, adjust the objective lens focus position by means of the z-motor 112 and ensure that the z layer with the maximum contrast is within the field of view 116. Such a design can eliminate the need for focusing predefined points, increase the quality of the output image volume and increase the scanning speed. A dynamic focus adjustment algorithm is provided to control the z-motor based on contrast information extracted from the image volume being scanned. In one embodiment, the algorithm uses an estimation of squared gradient magnitude and its derivatives along x, y and z directions.

Figure 10:
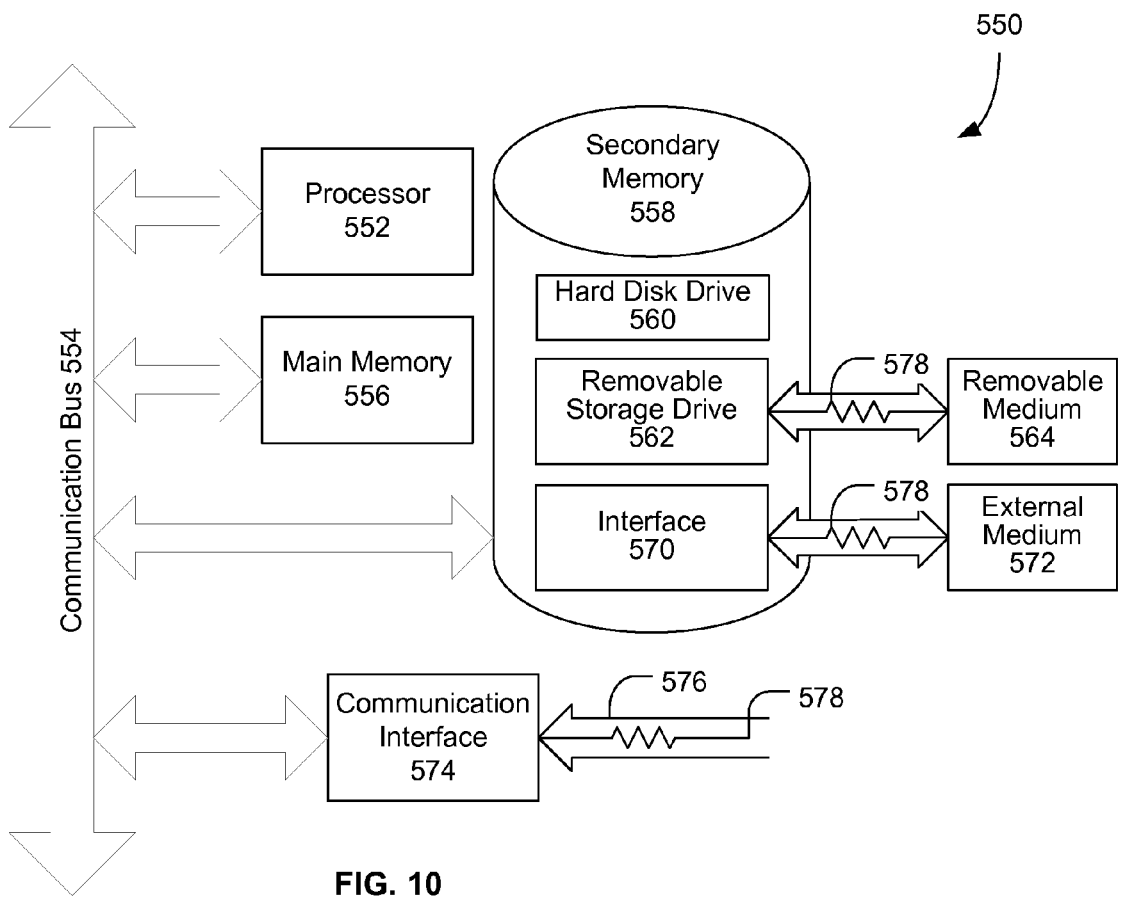
FIG. 10 is a block diagram illustrating an example computer system that may be used in connection with various embodiments described herein.

FIG. 10 is a block diagram illustrating an example computer system 550 that may be used in connection with various embodiments described herein. For example, the computer system 550 may be used in conjunction with an optical microscopy system as previously described with respect to FIGS. 1, 2, and 3. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A system for creating a contiguous digital image volume of portion of a microscope sample, comprising:
    a motorized stage configured to support a microscope sample and move the microscope sample in a first direction and second direction in the plane of the motorized stage;
    an illumination system configured to illuminate a portion of the microscope sample;
    a first objective lens for viewing the illuminated portion of the microscope sample, the first objective lens positioned along a first optical axis centered about the portion of the sample illuminated by the illumination system and tilted relative to the plane of the motorized stage;
    a first camera optically coupled with the first objective lens and centered about the first optical axis to create a first focal plane that is tilted relative to the plane of the motorized stage, the first camera configured to create a plurality of first images of a portion of the microscope sample, each of the plurality of first images created along the first optical axis;
    a second objective lens for viewing the illuminated portion of the microscope sample, the second objective lens positioned along a second optical axis centered about the portion of the sample illuminated by the illumination system and tilted relative to the plane of the motorized stage, wherein the second optical axis is orthogonal to the first optical axis;
    a second camera optically coupled with the second objective lens and centered about the second optical axis to create a second focal plane that is tilted relative to the plane of the motorized stage, the second camera configured to create a plurality of second images of a portion of the microscope sample, each of the plurality of second images created along the second optical axis;
    a focusing system configured to focus the first camera and the second camera during creation of each first image and each second image;
    an image composer configured to align adjacent first images into a contiguous first image volume of a portion of the microscope sample, the image composer configured to align adjacent second images into a contiguous second image volume of the portion of the microscope sample, and the image composer configured to combine the first image volume and the second image volume into a three dimensional image of the portion of the microscope sample; and
    a data storage area configured to store the three dimensional image.

2. The system of claim 1, wherein the first camera and the second camera are area scan cameras.

3. The system of claim 1, wherein the first camera and the second camera are line scan cameras.

4. The system of claim 1, wherein the first camera and the second camera are time delay integration (TDI) cameras.

5. A method for creating a contiguous digital image volume of portion of a microscope sample, comprising:

moving a microscope sample on a motorized stage configured to support the microscope sample in a first direction and second direction in the plane of the motorized stage;

illuminating a portion of the microscope sample;

creating a plurality of first images using a first camera optically coupled with a first objective lens and centered about a first optical axis to create a first focal plane that is tilted relative to the plane of the motorized stage, wherein the first objective lens is positioned along the first optical axis and tilted relative to the plane of the motorized stage and wherein the first camera is configured to create the plurality of first images along the first optical axis;

creating a plurality of second images using a second camera optically coupled with a first objective lens and centered about a second optical axis to create a second focal plane that is tilted relative to the plane of the motorized stage, wherein the second objective lens is positioned along the second optical axis and tilted relative to the plane of the motorized stage and wherein the second camera is configured to create the plurality of second images along the second optical axis, wherein the second optical axis is orthogonal to the first optical axis;

focusing the first camera and the second camera during creation of each first image and each second image;

aligning adjacent first images into a contiguous first image volume of a portion of the microscope sample;

aligning adjacent second images into a contiguous second image volume of the portion of the microscope sample;

combining the first image volume and the second image volume into a three dimensional image of the portion of the microscope sample; and storing the three dimensional image in a data storage area.

6. The method of claim 5, wherein the first camera and the second camera are area scan cameras.

7. The method of claim 5, wherein the first camera and the second camera are line scan cameras.

8. The method of claim 5, wherein the first camera and the second camera are time delay integration (TDI) cameras.

* * * * *